United States Patent
Le Gal (10) Patent No.: US 9,943,895 B2
(45) Date of Patent: Apr. 17, 2018

(54) ROLLING DEVICE, RESULTING ELECTROLYTE FILM, AND POWER STORAGE ASSEMBLY FORMED FROM AT LEAST ONE THUS-ROLLED FILM

(71) Applicant: Blue Solutions, Ergue Gaberic (FR)

(72) Inventor: Guy Le Gal, Quimper (FR)

(73) Assignee: Blue Solutions (FR)

( * ) Notice: Subject to any disclaimer, the term of this patent is extended or adjusted under 35 U.S.C. 154(b) by 240 days.

(21) Appl. No.: 14/761,812

(22) PCT Filed: Jan. 17, 2014

(86) PCT No.: PCT/EP2014/050911
§ 371 (c)(1),
(2) Date: Jul. 17, 2015

(87) PCT Pub. No.: WO2014/111527
PCT Pub. Date: Jul. 24, 2014

(65) Prior Publication Data
US 2015/0352613 A1    Dec. 10, 2015

(30) Foreign Application Priority Data
Jan. 18, 2013  (FR) ...................... 13 50473

(51) Int. Cl.
*B29C 43/24* (2006.01)
*B21B 37/58* (2006.01)
(Continued)

(52) U.S. Cl.
CPC .............. *B21B 37/58* (2013.01); *B29C 43/24* (2013.01); *B29C 43/305* (2013.01);
(Continued)

(58) Field of Classification Search
CPC ...... B29C 43/24; B29C 43/46; B32B 37/0053; B32B 37/1054; B32B 41/00; B21B 37/58
(Continued)

(56) References Cited

U.S. PATENT DOCUMENTS 2,737,130 A * 3/1956 Rhodes .................... A21C 3/02
                                                                100/171
3,555,596 A * 1/1971 Thieme .................. B21B 31/32
                                                                100/170
(Continued)

FOREIGN PATENT DOCUMENTS

| EP | 1000674 | A2 | 5/2000 |
|----|---------|-----|--------|
| EP | 2433792 | * | 3/2012 |
| JP | 6-206658 | * | 7/1994 |

OTHER PUBLICATIONS

International Search Report for Application No. PCT/EP2014/050911 dated Apr. 14, 2014.

*Primary Examiner* — James P Mackey
(74) *Attorney, Agent, or Firm* — Lerner, David, Littenberg, Krumholz & Mentlik, LLP (57) ABSTRACT

The present invention relates to a rolling device including a stationary first assembly (110), comprising at least one first rolling cylinder (110), and a movable second assembly (120), comprising at least one second rolling cylinder (122). The second assembly (120) is movable along at least one degree of freedom relative to the stationary first assembly (110) such that the axis (X2) of the second cylinder (122) is movable relative to that of the first cylinder (110) so as to control the distance between the cylinders (110, 120). Said rolling device is characterized in that it includes: a resilient contact means (130) that exerts a first force on the movable assembly (110), said resilient contact means (130) being configured so as to give way when the reaction force exerted by the movable assembly (110) on these latter is greater than
(Continued)

a predetermined threshold force; and a control means (160) that exerts, on the movable assembly (110), a second force having a component essentially opposite the force exerted by the resilient contact means (130).

13 Claims, 4 Drawing Sheets

(51) Int. Cl.
*B32B 37/00* (2006.01)
*B32B 37/10* (2006.01)
*H01M 10/0565* (2010.01)
*B29C 43/30* (2006.01)
*H01M 2/14* (2006.01)
*H01M 2/16* (2006.01)
*H01M 10/052* (2010.01)
*B32B 41/00* (2006.01)
*B29L 31/34* (2006.01)

(52) U.S. Cl.
CPC ...... *B32B 37/0053* (2013.01); *B32B 37/1054* (2013.01); *H01M 2/145* (2013.01); *H01M 2/16* (2013.01); *H01M 10/052* (2013.01); *H01M 10/0565* (2013.01); *B29L 2031/3468* (2013.01); *B32B 41/00* (2013.01); *B32B 2457/10* (2013.01); *B32B 2457/16* (2013.01); *H01M 2300/0082* (2013.01)

(58) Field of Classification Search
USPC .................................. 425/151, 154, 194, 367
See application file for complete search history.

(56) References Cited

U.S. PATENT DOCUMENTS

| | | | | |
|---|---|---|---|---|
| 4,080,890 | A * | 3/1978 | Dreher | D21G 1/00 100/162 R |
| 4,676,862 | A * | 6/1987 | Kuehnert | B29C 43/44 100/168 |
| 6,019,801 | A * | 2/2000 | Gauthier | B21B 45/0242 29/623.3 |
| 2009/0179344 | A1* | 7/2009 | Maekawa | B29C 43/222 264/175 |
| 2015/0314580 | A1* | 11/2015 | Sato | B32B 25/04 428/214 |

* cited by examiner

ROLLING DEVICE, RESULTING ELECTROLYTE FILM, AND POWER STORAGE ASSEMBLY FORMED FROM AT LEAST ONE THUS-ROLLED FILM

CROSS REFERENCE TO RELATED APPLICAIONS

This application is a national phase entry under 35 U.S.C. § 371 of International Application No. PCT/EP2014/050911, filed Jan. 17, 2014, published in French, which claims the benefit of the filing date of French Patent Application No. 1350473, filed Jan. 18, 2013, the disclosures of which are hereby incorporated herein by reference.

The present invention relates to the field of electricity storage, especially batteries or supercapacitors.

More precisely, the invention applies to the technical field of the manufacture of films intended to constitute a cathode, an anode or an electrolyte.

It is known to manufacture such films by mixing materials intended to form the film and by extruding the mixture. Once extruded the material then passes through a nozzle which gives it a flattened form. The thickness of the film at nozzle output is generally one or several hundreds of microns. To decrease the thickness of the film down to the target thickness, or around twenty microns, the film is then passed through a rolling mill. To be more precise, the film is driven between two cylinders which exert on the latter pressure enabling crushing of the film, with respect to the selected predetermined air gap.

Figure 1:
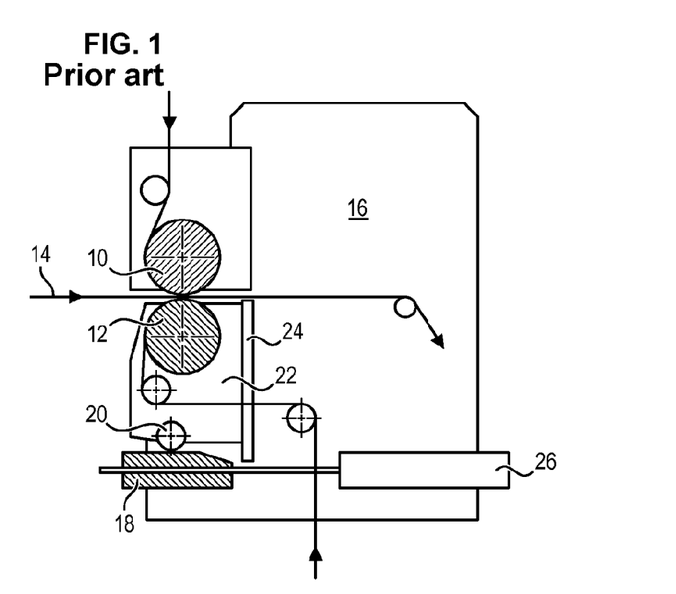
FIG. 1 previously described schematically illustrates an embodiment of a device according to the prior art, FIG. 2 schematically illustrates a rolling device according to a first embodiment of the present invention, FIG. 3 schematically illustrates the position control means of the mobile cylinder of the first embodiment of the present invention, FIG. 4 schematically illustrates an embodiment of micrometric detection means of the control means displacement according to the invention, FIGS. 5 and 6 schematically illustrate rolling devices according to a second and a third embodiment of the present invention, and FIG. 7 also schematically illustrates another variant of a rolling device integrating the characteristics of the invention.

In the prior art, rolling mills of the type shown in the appended FIG. 1 are known already, comprising conventionally an upper cylinder 10 and a lower cylinder 12 between which the film 14 is intended to pass. Generally, the upper cylinder 10 is fixed and attached to the frame 16, while the lower cylinder 12 is mobile to adjust the distance between the two cylinders which will determine the thickness of the film at output of the rolling mill. There is also the inverse assembly with the lower fixed cylinder.

The position of the lower cylinder 12 is regulated on each side, at the level of the axial ends of the cylinder, by means of a sloping wedge 18 comprising a first release portion with a strong slope and a second adjustment portion with a very slight slope (of the order of 1%).

This wedge lifts a roller 20 attached to bearings 22 of the lower cylinder disposes respectively at each end of the cylinder. Each bearing 22 evolves on a vertical slide 24 allowing it to effect translation relative to the frame 16. The wedge 18 is mobile in translation according to an axis (generally horizontal) perpendicular to the movement of the slides 24 and its position is modified by an actuator 26 controlled by a motor. Due to the wedge 18 being mobile in translation and being sloped, its displacement modifies the vertical position of the lower cylinder 12 (by sliding of the bearing 22 in the slide 24) and the distance of the two cylinders 10 and 12.

This type of known system raises several problems: first, when an incident occurs and a mass of material exiting from the nozzle and appearing between the cylinders 10 and 12 is detected, it is provided that the wedge 18 is moved by command of the actuator 26 until it reaches the release slope and substantially moves apart the cylinders 10 and 12 to let the excess thickness of material pass through. Nevertheless, the time when the wedge 18 is released is often too long to avoid damage to the device (breakage or deformation of mechanics—cylinders, rollers—due to overload of force).

Also, when it is necessary to release a cylinder 12 the precise adjustment of the thickness of the film 14 is lost. It is also evident that ideal adjustment is not necessarily reproducible with precision due to the long mechanical chain present between the motor (the element whereof the angular position can be adjusted and which acts on the axial transmission of the sloped wedge) and the lower cylinder. The time adjustment is therefore relatively considerable at each start-up of the rolling device and generally needs to be repeated several times before the right adjustment is found.

Also, as the device presents a wedge system at each longitudinal and of the cylinder 12, and the contact forces exerted by the wedges are unknown, disproportionate forces can be exerted by error during adjustment of the parallelism of both cylinders 10, 12 at the start of rolling. Similarly, due to an imbalance between the forces exerted by the two wedges, there can be a parallelism defect between the two cylinders 10, 12 producing irregularity in the thickness of the film in the transversal direction. To compensate this problem, the machine in the prior art can be equipped with a regulating system (not shown) of the position of the cylinders 10, 12. Such a system can for example be based on the measured crushing of ductile metallic wires (such as tin wires) placed between the cylinders. But this needs the presence of an additional measuring and adjustment system and new adjustment operations, often with several iterations, which is costly and time-consuming.

In the prior art, it is evident that the adjustment step of the distance of the cylinders 10, 12 is fairly long and complex and must be repeated after each incident. In this context, the aim of the invention is to propose a rolling device for film which enables easier adjustment and major precision at the level of the thickness of the resulting film, with respect to the selected air gap. The aim of the invention is to provide a device which is simpler and faster to adjust than known devices according to the prior art, and which prevents damage to the mechanics.

The above aims are attained according to the invention by means of a rolling device comprising a first fixed assembly connected to a frame of the device and comprising at least one first rolling cylinder rotatably mounted about its axis and a second assembly, mobile, comprising at least one second rolling cylinder rotatably mounted about its axis, the second assembly being mobile according to at least one degree of freedom relative to the first fixed assembly such that the axis of the second cylinder is mobile relative to that of the first cylinder to regulate the distance between the cylinders, characterized in that the rolling device comprises:
  resilient contact means which exert a first force on the mobile assembly in the direction of approximation of the first fixed assembly, these resilient contact means being configured to give way when the reaction force exerted by the mobile assembly on the latter is greater than a predetermined threshold force, and
  control means which exert on the mobile assembly a second force having a component essentially opposite the force exerted by the resilient contact means.

According to the invention, the control means comprise mechanical means which define a mechanical stop adjustable for the second mobile assembly.

In this way, according to the invention on met in contact the two rolling cylinders by means of the resilient contact means and the control means generate opposing force to finely regulate the position of the cylinder by slightly compressing the resilient means. However, the different means are configured such that the force exerted by the film passing between the two cylinders (in normal conditions) is not sufficient to cause compression of the resilient contact means and therefore modify the position of the cylinder.

As the contact means are configured to be compressed then give way when the reaction force reaches a certain threshold (specifically the threshold at which there is considered to be clogging), the space between the cylinders can be opened without problem and on any damage to the device is avoided. It is evident that the threshold force corresponds to the rolling needs plus overload force to ensure contact on the control means and accordingly stability of the system.

Following an incident, it suffices to return the contact means to their initial position defined by the mechanical stop imposed by the control means, to regain the initial state of the device without need to repeat fine adjustment of the position of the cylinder. According to the invention it is not in fact the contact means which make adjustment of the distance between the cylinders, but the mechanical stop of the control means. With the control means staying in place, the position of the mobile cylinder is again automatically regulated when the contact means are returned to operation.

Also, the control means of such a device decoupled from the means providing release can in this way be nearest to the mobile cylinder, which limits the length of the mechanical chain and heightened precision and stability of the adjustment as well as decreases the variations in sides due to the elasticity of the mechanical pieces.

In conventional terms, each of the rolling cylinders is connected to the corresponding (fixed or mobile) assembly by two bearings each located at one of its ends and into each of which the axis of the cylinder is inserted.

The resilient contact means are preferably configured so that the forces they apply to the mobile assembly are distributed equally over each bearing of the cylinder. This result can be attained by means of a strain gauge which measures the strains exerted on each of the bearings of the mobile cylinder or preferably because the transmission chain of strains from a single contact element to the two bearings, or when the contact means comprise two contact elements each intended to send force to one of the bearings of the cylinder, due to the nature of this element.

The invention is distinguished from the prior art not only structurally, but also has a real advantage relative to the prior art. In fact according to the prior art, it was necessary to regulate the position of the cylinders from contact without knowing the elastic deformation of the assembly of the mechanical chain under a given force. This disadvantage could have been compensated by means of a strain gauge but this compensation would have needed the addition of another supplementary element in the already long mechanical chain.

The invention more simply controls the parallelism of the cylinders, the latter appearing naturally when the forces applied to the two bearings are equal.

The resilient contact means according to the invention preferably comprise an envelope filled with fluid and comprising an output valve for fluid opening when the pressure is greater than a predetermined pressure. The resilient contact means form means which can move from a contact state to a release state totally reversibly, without any need to change one or the other of the pieces of the device. The fluid is preferably gas, more compressible than liquid, and which therefore allows a better margin of use of the device as well as faster retraction. The envelope is for example an elastic envelope made of rubber or any equivalent means. Such a system has the advantage of not being destructive, when the contact means giver way.

Also, it is not useful with such a system to use a strain gauge or means of measuring the force since the force F exerted by the contact means is available by simple calculation of the product of the pressure P by the surface S of stress involved, (F=P*S), each of the parameters P and S able to be obtained easily The resilient contact means can as a variant comprise for example a mechanical assembly ensuring resilient stressing of the mobile assembly towards a contact position but comprising an integrated mechanical fuse (or a mechanical device with preregulated trigger limit). An example of such a mechanical fuse can be a break initiator piece calculated to give way when the reaction force which is applied to it reaches a threshold corresponding to the force resulting from clogging.

The control means preferably comprise at least one mechanical lever comprising a support point, especially an axis of rotation, on an element attached to the fixed assembly, the lever or at least one of the levers also being in contact with the mobile assembly and with a control adjusting element, the distance between the point of contact with the mobile assembly and the support point being less than the distance between the point of contact with the adjusting element and the support point. This produces fine adjustment and force multiplication, the range of the displacement of the element mobile caused by displacement of the lever being less than the range of displacement imposed on the control-adjusting element. Preferably, the control means comprise several levers in series. The ratio between displacement of the control adjusting element, at input, and that of the mobile assembly, at output, is preferably selected such that it is greater than 20 between the input of the control means and the output on the mobile assembly.

The control means advantageously comprise means for maintaining strain (or return means) of at least one lever. These return means are adapted to keep the kinematic chain defined between the input adjustment control element and the output stop, in contact with the input control element. Cancelling of the contact force (exerted by the resilient contact means) on the levers is compensated, for example in case of release. This allows optimal operation of the adjustment device even in the event where mechanical assembly is not perfect (cancellation of clearances). This also allows control means to be kept in position, even in case of erasing of resilient contact means.

The control element of the control means comprises advantageously a mobile device supported on a lever, and driven manually or automatically. The mobile device is for example a manual screw, a cam, or an electric actuator with ball screw, etc.

The lever or at least one of the levers, on the one hand, or the element or at least one of the elements in contact with the levers, on the other hand, complies so as to present a contact area projecting from the piece, defining point or linear contact. This projection area enables good reproducibility in contact so as to avoid accidental contact between the different elements of the lever arms such as might occur if the contact areas were extended (localised contact with precision such as advocated by the invention allows better control of forces).

This projection area can be created in the form of a pin inserted partially into a recess of the element, ensuring contact on the generatrix of a resistant piece. Contact is then linear. This solution is also inexpensive.

The device comprises a sensor attached to an element of the mobile assembly and the fixed assembly and comprising a mobile portion intended to make contact with a stop of the other element of the mobile assembly and the fixed assembly for measuring the relative displacement of the mobile assembly of the rolling device. Such a sensor is preferably placed on each side of the cylinder.

The mobile assembly is preferably mobile to pivot relative to the fixed assembly.

It is evident that the rolling device can comprise two support pivoting arms, an arm being located at each end of the mobile cylinder between this end and the frame of the rolling device.

The device can comprise a pivot axis and/or one or more, for example two, transversal bars, attached to each of the two arms fulfilling the function of anti-roll device between the two ends of the mobile cylinder, and limiting the angular offset between these two ends. This transversal bar or these bars therefore limit the non-parallelism of the cylinders and also use bearing rollers for the mobile cylinder which have no need of making up this offset and can allow more precise adjustment of the position of the cylinder and therefore of the rolling.

The device preferably comprises contact and/or adjustment means at the level of each of the arms.

The control means at the level of each bearing can be linked and adjusted together or independently of each other.

The device can also comprise decambering means connecting the two cylinders and applying to the axes of the cylinders a force compensating the resilient deformation of the cylinders (flexion especially) due to the effect of the rolling on the latter. Such means are known from the prior art.

The mobile cylinder is generally the lower cylinder of the device and the resilient contact means are placed under the lower cylinder and exert vertical force upwards. The mobile cylinder could however be the upper cylinder. The cylinders can also be placed at the same horizontal level, the direction of displacement of the film being then vertical.

The point of contact between the mobile assembly and the control means is selected to be the closest possible to the axis of the mobile cylinder to produce the best adjustment precision.

Another aim of the invention is a method for starting up a device according to the invention, comprising:
  a first step during which the resilient contact means are stressed as far as a predetermined threshold force so that they exert force on the mobile cylinder putting it in contact with the fixed cylinder, with a predetermined force; and
  a second step during which the contact means are opposed by acting on the control means so as to modify the position of the mobile cylinder.

"Contact with a predetermined force" means not only that the cylinders are in contact but also that the mobile cylinder applies a predetermined force to the fixed cylinder. This predetermined force is selected to be equivalent to the force applied to the film as it passes through the rolling mill. By way of reminder, in earlier systems, it is difficult to control the force applied between the cylinders.

The device comprises two displacement sensors of the mobile assembly and, when start of displacement of the mobile assembly relative to the fixed assembly (corresponding for example, to the delamination of a micron from the mobile cylinder relative to the fixed cylinder) is detected by means of each sensor, a reference zero is initialised (reset of the adjustment of each sensor).

Action on the control means is continued to arrive at the distance selected as a function of the thickness of the product, the distance being measured by means of the sensors.

The invention also relates to an electrolyte of a thickness less than 15 microns, whereof the variation in thickness according to a transversal or longitudinal cross-section is less than +/−2 microns (or variation maximal of 4 microns in all) for a width of the order of 30 cm. Such an electrolyte is obtained by means of the method described previously and has highly advantageous characteristics in terms of regularity. Such an electrolyte reduces the internal resistance of batteries formed from drawing such a film and increasing the storage capacity.

When the width is less (150 mm for example), the thickness can be a thickness less than or equal to 10 microns while the variation in thickness according to a transversal section is less than +/−2 microns.

This type of electrolyte is obtained by rolling, especially hot-rolling.

The electrolyte comprises at least one polymer and a lithium salt, especially at least two types of polymers such as polyvinylidene fluoride (PVDF) and ethylene oxide polymers (POE). The lithium salt is LiTFSI (salt of Lithium bis(TriFluoromethylSulfonyl)Imide).

The invention also relates to a power storage assembly, especially a battery, comprising such an electrolyte.

Other characteristics, aims and advantages of the present invention will emerge from the following detailed description and with respect to the appended drawings given by way of non-limiting example and in which.

The device 100 shown in the appended FIG. 2 will now be described, according to an embodiment of the present invention.

Conventionally, the device 100 comprises a frame 106 which bears a fixed assembly 110 comprising an upper cylinder 112 of essentially horizontal axis X1 and a mobile assembly 120 comprising a lower cylinder 122 of axis X2 essentially horizontal and parallel to the axis X1 of the upper cylinder 112. The upper cylinder 112 is guided and driven in rotation about its axis X1 by any appropriate means. Similarly, the lower cylinder 122 is guided and driven in rotation about its axis X2 by any appropriate means. A film F, such as a composition film of a battery, for example cathode or electrolyte, is intended to be fed in between these cylinders 112 and 122.

The fixed 110 and mobile 120 assemblies each comprise two bearings located respectively at their axial ends, intended to support the cylinders 112 and 122 in rotation about the axes X1 and X2. Each of these bearings preferably comprises a housing in which a trunnion is inserted in a single piece with the respectively associated cylinder 112 or 122. The trunnions are mobile in rotation relative to the bearings and materialise the axis of rotation X1 and X2 of each of the cylinders 112, 122.

The upper cylinder 112, or more exactly its bearings, is attached to the frame 106 of the device and is therefore considered as a fixed cylinder.

The lower cylinder 122, more exactly each of its bearings, is attached to a support arm 124. An arm 124 is therefore present at each end of the lower cylinder 122. The arms 124 belong to the mobile assembly 120 and are mobile to pivot relative to the frame 106 about the same essentially horizontal axis X3, and parallel to the axes of rotation X1, X2 of the cylinders 112 and 122. This axis X3 is called articulation axis of the arms 124 and is located at a distance from the axis X2 of the lower cylinder. The articulation axis X3 of each arm 124 and the axis of rotation X2 of the lower cylinder 122 are placed at the two opposite ends of the arms 124.

In its lower part the frame 106 also comprises resilient contact means 130 adapted to exert on the mobile assembly 120 a first force tending to press the lower mobile cylinder 122 in contact with the upper fixed cylinder 112.

As mentioned previously, these resilient contact means 130 are however adapted to give way when a reaction force exerted on the mobile assembly 120 is greater than a predetermined threshold force.

Figure 2:
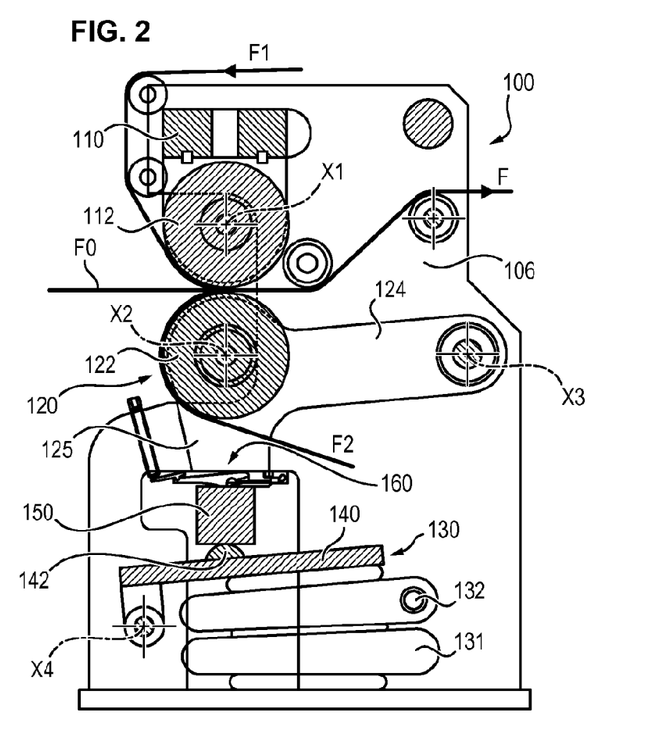

According to the embodiment shown in FIG. 2, the resilient contact means 130 comprise a pneumatic element 131 constituted by a supple and deformable envelope, for example made of rubber or any equivalent material, delimiting a closed cavity of variable volume, intended to be filled with fluid such as air. The pneumatic element 131 is connected at its upper end to a support plate 140 also connected to the frame 106 at one of its ends by an articulation axis X4 horizontal and parallel also to those of the cylinders 112 and 122. The support plate 140 comprises on its upper face a semi-cylindrical boss 142, whereof the generatrix extends parallel to the axis X4, producing linear support with a superposed lower bar 150, essentially horizontal, belonging to the mobile assembly 120. The bar 150 connects both arms 124 and is attached to the latter.

As is evident from FIG. 2, the bar 150 preferably connects two secondary wings 125 of the arm 124 projecting downwards at the level of the end of the arms 124 opposite the articulation axis X3 and which bears the lower cylinder 122.

The pneumatic element 131 can comprise a safety valve (or discharge valve) connecting the internal volume of the cavity with the exterior and which discharges air rapidly from the cavity when the pressure in the latter becomes too high. Such a valve is shown under reference 132 in FIG. 2.

The pneumatic element 131 is centred relative to the cylinder 122, at mid length from the latter, and the support plate 140 is in linear contact on the link bar 150 over its entire length. In this way, the forces generated by the pneumatic element 131 are also distributed across each bearing of the lower cylinder 122 and the parallelism of cylinders 112 and 122 is controlled perfectly well.

In this way, the contact means 130 are adapted to exert an essentially vertical directional force upwards on the bar 150, and therefore the lower cylinder 122: due to this, when the pneumatic element 131 is inflated, the support plate 140 and the boss 142 are driven upwards according to a trajectory dictated by the articulation axis X4 of the support plate 140. As the arms 124 and the lower bar 150 have a degree of freedom to pivot relative to the frame 106, they do not oppose the movement of the support plate 140 and are moved according to a trajectory dictated by the link around the articulation axis X3 of the arms 124. The lower cylinder 122 is put in contact by this with the upper cylinder 112. The two arms 124 are connected by means of the lower link bar 150 and by means of the shaft forming the articulation axis X3 of the arms 124.

The assembly comprising the bar 150 and the shaft forming the axis X3, given that this axis is connected mechanically to the arms to be attached to the latter, for example by a collar with a screw belt or a pin member, constitutes an effective anti-roll device which also participates in ensuring parallelism of the cylinders 112 and 122. In fact, an angular link is formed between the arms, specifically that the latter can be offset angularly one relative to the other only in minimal latitude. Therefore the rollers are protected from the bearings of the cylinder, which can be accordingly selected to be highly precise and improve the precision of the rolling.

Without it being obligatory, it is evident that the boss 142 which determines the point of application of the force generated by the pneumatic element 131 on the bar 150 is located between the axis X4 and the point of application of the force of the pneumatic element 131 on the support plate 140. This arrangement multiplies the force applied to the bar 150 relative to that applied to the support plate 140 by the pneumatic element 131. So by way of non-limiting example, the distance between the point of application of the force of the pneumatic element 131 on the support plate 140 and the axis X4 is greater by around twice the distance between the boss 142 and the axis X4, which doubles the force applied to the bar 150 relative to that applied to the support plate 140 by the pneumatic element 131.

It is evident that the system ensures parallelism of the cylinders 112 and 122 when the latter are not in contact (during opening and approximation of the cylinders 112 and 122) but the final parallelism to the micron of the cylinders 112 and 122 is preferably ensued by means of a system to be described hereinbelow.

Figure 3:
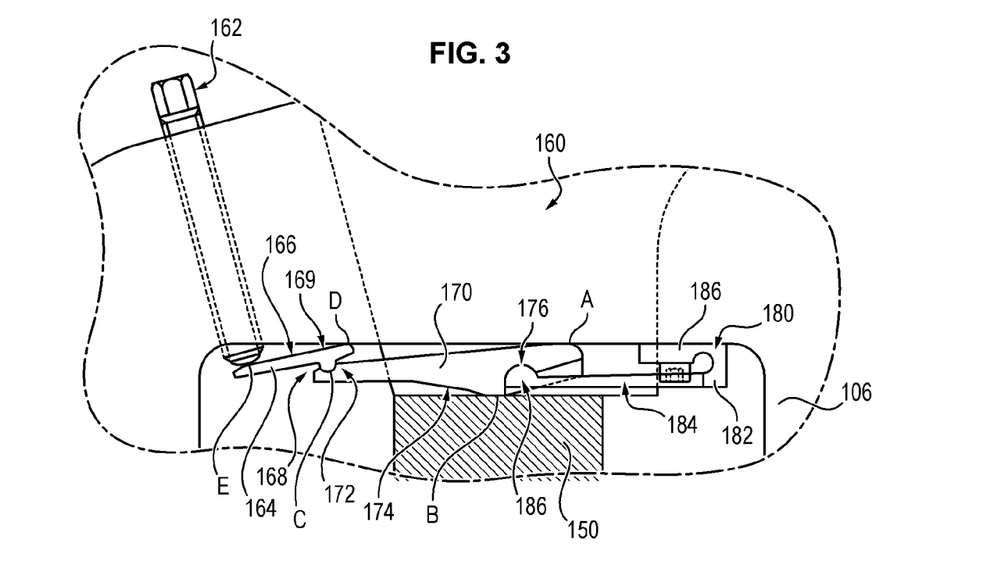

As is evident also in FIG. 2, the device according to the present invention preferably comprises fine control means 160, shown in more detail in FIG. 3. These means 160 enable adjustment of the air gap between the cylinders 112 and 122.

Control means 160 are placed near each longitudinal end of the lower cylinder 122 (or near each arm 124). In other words, the control means 160 comprise 2 devices identical to that which will be described hereinbelow.

According to the preferred embodiment shown in FIG. 3, the control means 160 comprise at least one lever forming a mechanical stop adjustable for the mobile assembly, interposed between said mobile assembly and input adjustment means. More precisely two levers 164 and 170 are provided placed in series between the input adjustment means, formed by a screw 162, and the mobile assembly 120, and return means 180 adapted to keep the mechanical chain of the levers supported on the adjusting screw 162 during retraction of the resilient contact means 130.

The use of at least one lever, and preferably two levers in series, allows fine adjustment of the position of the stop defined for the mobile assembly 120 by ensuring demultiplication of the course of adjustment means at input 162 and vice versa multiplication of the force transmitted.

Even more precisely, according to the preferred embodiment shown in FIG. 3 the control means 160 first comprise an adjusting screw 162 capable of being controlled manually and fixed to the frame 106 (the frame 106 plays the role of fixed nut attached to the screw 162). The control means 160 also comprise a first lever 164, comprising an essentially horizontal arm 166 and a semi-cylindrical lower projection 168. The lower projection 168 is intended to be placed in a recess 172 having an essentially complementary shape arranged in a second lever 170 belonging to the control means 160.

Each second lever 170 comprises an essentially horizontal arm 174 comprising at first end the recess 172 open upwards for receiving the projection 168. At the other end of the arm 174, the second lever 170 also comprises a second recess 176 open downwards and receiving return means 180.

The first and second levers 164 and 170 are made of metallic material, for example treated steel, and are rigid. It is also clear that the levers 164 and 170 are connected at the level of the projection 168- recess 172 by a vertical pin 169, one of the levers 164 or 170 comprising an oblong hole which receives the above pin 169 to create relative transversal immobilisation of the levers 164 and 170 and retains freedom of angular pivoting of the lever 164 relative to the lever 170 by displacement of the projection 168 in the recess 172.

Each adjustment device 160 also comprises return means 180. Such return means can form the object of different embodiments.

According to the embodiment illustrated in FIG. 3, these return means 180 comprise a U-shaped spring blade 182 comprising a lower arm 184 and an upper arm 186 forming a baseplate. The blade 182 is connected by the upper baseplate 186 to the frame 106. The lower arm 184 has a projection 186 oriented upwards at its free end, this projection 186 being complementary to the recess 176 of the second lever 170, in which it is inserted.

This spring 180 is prestressed and the projection 186 therefore comprises an imprint for controlling the position of the levers 164 and 170, whether the contact means 130 are activated or not, and whether the second lever 170 is in contact or not with the lower link bar 150.

The adjustment device 160 operates as follows: the second lever 170 is supported on the frame 106 at A, is in contact with the lower bar 150 at B and with the first lever 164 at C, at the point where the projection 168 is inserted into the recess 172. The contact site A is located at the end of the lever 170 opposite the point where the recess 172 is located. The first lever 164 is also supported on the frame 106 at D at a first end of the lever arm 164 and with the adjusting screw 162 at E at the opposite end of the arm 164. It is evident that the above contact points between the different elements are lines essentially parallel to the axes X1 and X2 of the cylinders 112, 122 except for the support of the screw 162 on the first lever 164 at E which is a quasi-occasional support.

In this way, the adjustment device 160 is capable of exerting essentially vertical directional force downwards on the lower link bar 150 by means of the point of contact at B of the second lever 170, and therefore on the lower cylinder 122 attached by its bearings to this bar 150.

As is evident in FIG. 3, when the adjusting screw 162 is clamped it pulls the first end of the first lever 164 downwards (support point E). The support point at C therefore also lowers due to the reaction at the level of the point of reaction D on the frame 106 and pulls the corresponding end of the second lever 170 (at C also) downwards. Because of this, the point B of the second lever 170 in contact with the horizontal bar 150 exerts vertical force downwards on the bar 150 at B and moves downwards relative to the reaction fixed at A. This modifies the position of the bar 150 and therefore of the lower cylinder 122. In fact, since the contact means 130 are elastically deformable, the force exerted by the second lever 170 on the bar 150 is sufficient for the air inside the envelope 131 to be compressed and for the position of the bar 150 to be modified due to the action of the control means 160.

It is evident that by means of the adjustment device 160, can apply to the bar 150 less displacement than that impressed vertically to the screw 162, while the vertical force applied to the lower link bar 150 is much greater than that necessary to impress on the screw 162 to shift the latter in the same ratio. This is possible due to the distance ratios, respectively between points C and D and points D and E for the first lever 164 (distance DE>distance DC) and between points A and C and A and B for the second lever 170 (distance AC>distance AB). In fact, the ration of force to output of the system on the force at input of the system corresponds to the ratio of the distances (AC/AB)*(DE/DC). The ratio between displacement at output and displacement at input is the inverse of the latter. The ratios can be adapted to the preferred degree of precision. In the case shown here, they are AC/AB=3 and DE/DC=4, or a total ratio of 12.

Figure 4:
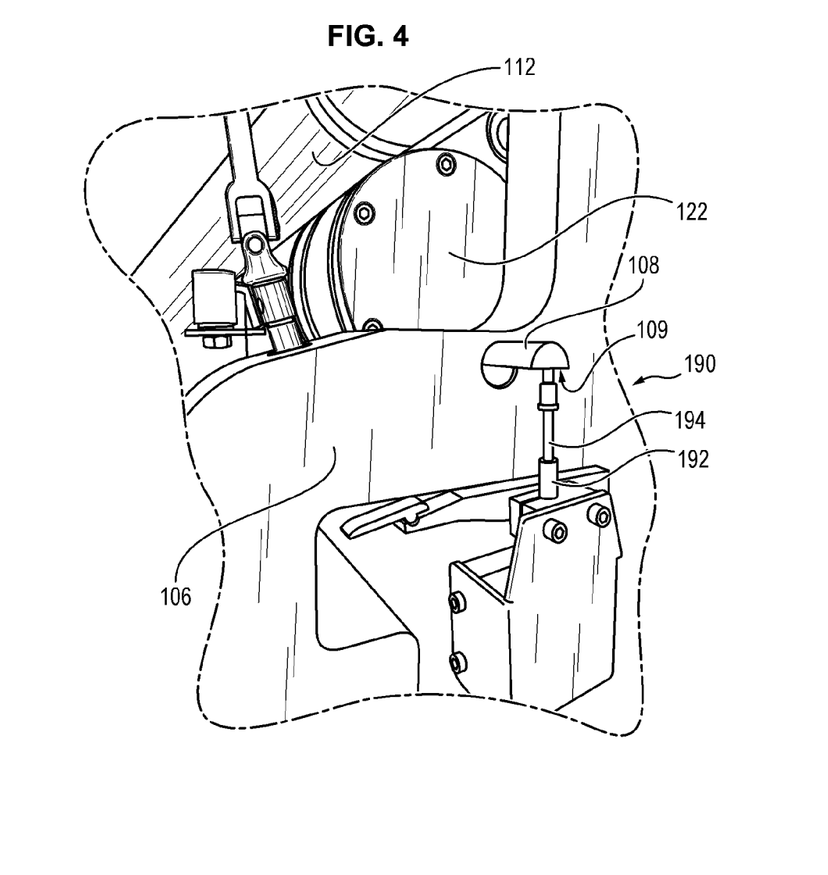

The rolling device according to the present invention also preferably comprises near each adjustment device 160, or at each end of the mobile cylinder 122, a detection device or micrometric comparator 190 illustrated in FIG. 4.

Such a detection device or micrometric comparator 190 can form the object of different embodiments.

According to the embodiment shown in FIG. 4 this device 190 comprises a body 192 (micrometric position sensor) attached to the lower link bar 150 and comprising a mobile probe 194 in translation relative to the body 192 according to an essentially vertical direction. A sensor placed in the body 192 detects movement of the sensor 192. The frame 106 is fitted with a stop 108 having an essentially horizontal contact surface 109 and intended to be in contact with the free upper end of the probe 194.

Detection devices 190 (or micrometric comparators) ensure precisely, for example to the tens of a micron, the parallelism of the cylinders 112 and 122, as explained hereinbelow.

Some main steps of the method for implementing the above device according to the present invention will now be described.

The device is started up as follows.

Before engaging the material or the materials intended to constitute the film F at rolling output, the pneumatic element 131 is inflated to a certain pressure, which puts the lower cylinder 122 and the upper cylinder 112 in contact with a predetermined force. This force corresponds to the working force applied to the film F during its passage in the rolling mill. This force is easy to determine in the device according to the invention since it is directly deductible from the pressure applied to the pneumatic element 131, this pressure being an easily measurable parameter. The probe 194 is in contact with the stop 108 of the frame 106.

The adjustment device 160 is actuated so as to slightly decrease the contact force between the cylinders 112 and 122 until incipient movement of the probe 194 is seen (detection by the sensor integrated into the body 192). This means that mechanical contact between the cylinders 112 and 122 has been slightly decompressed (visible by indication from the sensors). The sensors integrated into the body 192 are now reset to zero so that they indicate a reference position. It is evident that the reference position of the two adjustment devices 160 located at each end of the cylinder 122 is not necessarily attained simultaneously. Since the adjustment devices located to each side of the cylinder are decorrelated, parallelism of the cylinders can still be achieved.

The cylinders 112 and 122 are moved further away by way of the control means 160, to produce the preferred air gap. This is indicated by the sensors 192.

Additional force is applied to the resilient contact means 130 to augment the force on the adjustment devices 160 (it is clear that once they are adjusted, the control means 160 control the air gap between the cylinders 112 and 122) and have a stable stop even in case of slight variations of force necessary for crushing the film F.

If a problem does arise and clogging occurs at the level of the space between the 2 cylinders 112 and 122, the lower cylinder 112 applies vertical force downwards on the pneumatic element 131, and this compresses the air inside this element 131 and creates a slight distance from the cylinders 112 and 122 (via movement of the lower cylinder 122). If pressure greater than a predetermined pressure is attained in the element 131, this is likely to trigger the release valve 132. Air therefore escapes from the pneumatic element 131 which deflates, and this enables the horizontal bar 150 to fall back down and completely frees up movement of the lower cylinder 122, stopping rotation of the cylinders 112 and 122 (due to detection of movement of this lower cylinder 122) and rolling.

In this case, it is evident that the control means 160 are held in place by means of the return means 180 which ensure firm contact without play of the set of adjustment levers 164 and 170. In this way, during return to the production situation, by later repressurising of the element 131 the initial position of the cylinders 112 and 122 is regained without additional adjustment.

The second embodiment of the invention shown in appended FIG. 5 will now be described.

Figure 5:
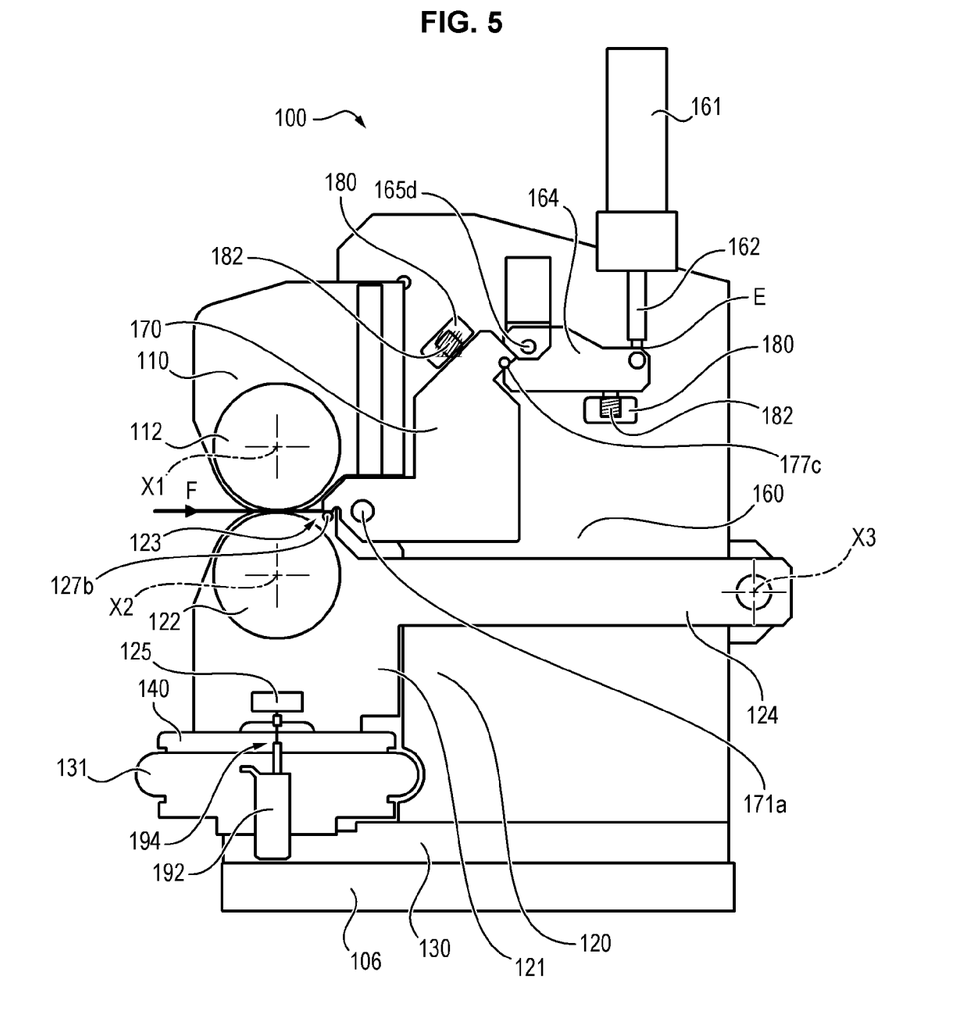

This FIG. 5 shows a device 100 which comprises a frame 106 (partially shown in FIG. 5) which bears a fixed assembly 110 comprising an upper cylinder 112 and a mobile assembly 120 comprising a lower cylinder 122, stressed towards the upper cylinder 112 by contact means 130 comprising a pneumatic element 131 supported against a horizontal bar connecting two articulated arms which support the lower cylinder 122 in rotation and extend between the latter.

The embodiment illustrated in FIG. 5 differs essentially from the embodiment previously described with respect to FIGS. 2 to 4 by the structure of the control means 160. The control means 160 illustrated in FIG. 5 in fact here too comprise, at each end of the cylinder 122, a set of two levers 164 and 170 interposed between the mobile assembly 120 and a control screw 162. But the two levers 164 and 170 are not in contact with a horizontal bar located below the arms of the lower cylinder 122, but directly with the bearing 121 of the lower cylinder 122, in an area 123 near the axis X2 of the lower cylinder 122 and the point where the film F passes between the cylinders 112 and 122.

The adjustment means 160 illustrated in FIG. 5, provided on each of the ends of the mobile assembly 120, are digitally controlled which increments the adjustment devices 160 in parallel.

According to the embodiment illustrated in FIG. 5, for the link between the different levers to be as precise as possible each element has been fitted at the level at which contact must be made (the bearing 120 and one 170 of the levers) with a pin 127, 177, for this purpose inserted in a recess provided of the bearing 121 or of the lever 170 and creating linear contact between the different elements, if necessary.

More precisely FIG. 5 shows a primary lever 164 articulated on the frame 106 at 165 (D). It is supported against the end of the screw 162 at E and in turn is supported at C on the pin 177 linked to the secondary lever 170.

The secondary lever 170 is articulated on the frame 106 at 171 (A), pressed against the pin 127 integral with the bearing 121 of the lower cylinder 122, at B.

In the embodiment illustrated in FIG. 5, the return means 180 comprise several springs 182 which are prestressed in compression.

More precisely according to the embodiment illustrated in FIG. 5, return means 180 comprising a spring or springs 182 is provided, joined respectively to each of the two levers 164 and 170.

According to the particular and non-limiting embodiment illustrated in FIG. 5, the ratio of the first lever 164 is 4 and that of the second lever 170 is 6.

The adjusting screw 162 of the control means 160 is driven this time by a motor 161. This motor 161 can be controlled in a closed loop as a function of measurements taken at output of the rolling mill.

It is also evident that according to FIG. 5 the levers 164 and 170 are not supported against the frame 106 but are connected to the frame 106 by respective axes 165 and 171 around which the levers 164 and 170 can pivot. The axes of rotation 165 and 171 of levers 164 and 170 however have the same role as the support point C and D of the previous embodiment, enabling multiplication of forces and division of displacement distances between the input and the output of a lever.

The detection device 190 also comprises a sensor fitted with a body 192 and a probe 194 but this time the body 192 is attached to the frame 106 and abuts against a projection 125 of the arm 124 belonging to the mobile assembly 120.

The other modifications comprise especially the fact that the support of the bearing 121 on the pneumatic element 131 is direct support by means of the support plate 140 and not support by means of a pivot link, as described previously with respect to FIG. 2 where the support plate was in turn mounted to pivot (no demultiplication of forces).

The third embodiment of the invention shown in appended FIG. 6 will now be described.

Figure 6:
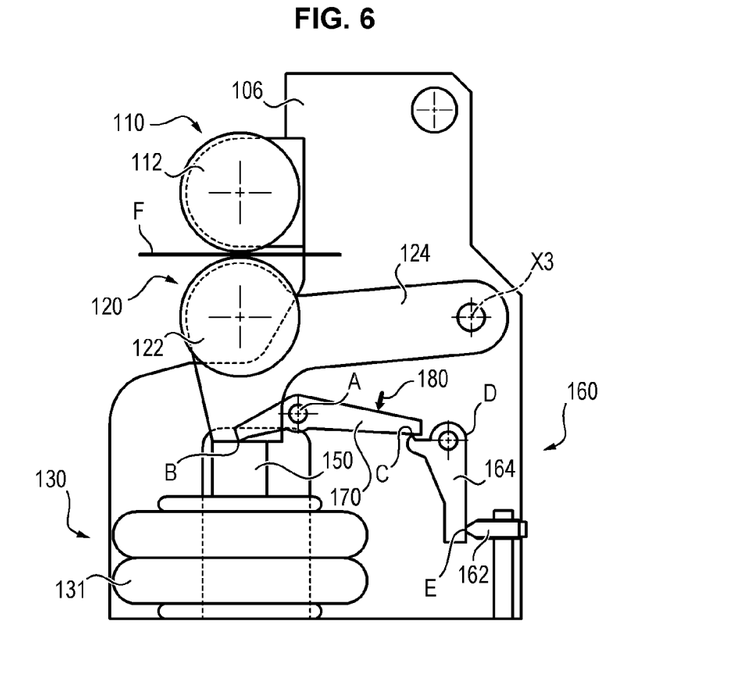

This FIG. 6 also shows a device 100 which comprises a frame 106 which bears a fixed assembly 110 comprising an upper cylinder 112 and a mobile assembly 120 comprising a lower cylinder 122, stressed towards the upper cylinder 112 by contact means 130 comprising a pneumatic element 131 linked to a horizontal bar 150 connecting two articulated arms 124 at X3 and which support the lower cylinder 122 in rotation.

FIG. 6 also shows control means 160 comprising two levers 164 and 170 interposed between the mobile assembly 120 and a control screw 162 attached to the frame 106.

The primary lever 164 is articulated on the frame 106 at D, supported against the end of the screw 162 at E and in turn supported on the secondary lever 170 at C. The DE/DC distance ratio is greater than 1 to respect the above multiplication force.

The secondary lever 170 is articulated on the frame 106 at A, supported against the bar 150 linked to the lower mobile assembly 120 at B. The AC/AB distance ratio is also greater than 1 to respect the above multiplication force.

Return means 180 stress the secondary lever 170 against the force exerted by the adjusting screw 162. So even if the resilient contact means 130 are removed, the secondary lever 170 stays supported against the primary lever 164 and the primary lever stays in contact with the adjusting screw 162.

Of course, the embodiments previously described are not limiting. The present invention encompasses all variants according to its scope.

Figure 7:
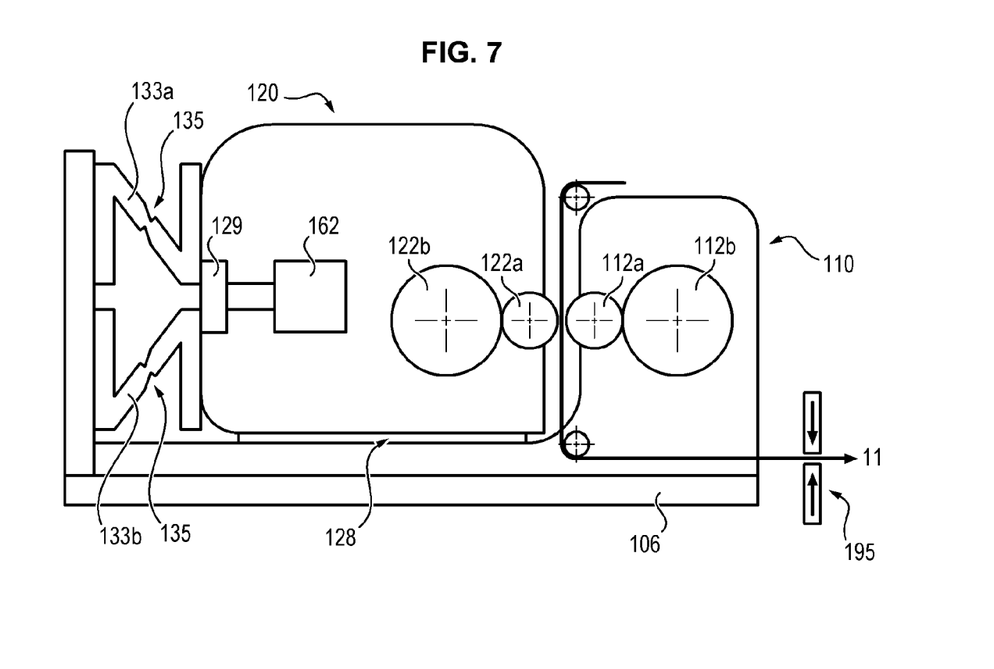

FIG. 7 also combines in a particular embodiment various variant embodiments according to the invention, which will now be described.

According to a first variant according to the present invention, the pneumatic element 131 can be replaced by a resilient mechanical element 133 integrating a mechanical fuse, for example a spring prestressing with break initiator 135, as shown in FIG. 7. It is also evident that the form of the elastic envelope of the pneumatic element is not limited to what has been described in the foregoing embodiments.

The device according to the present invention can also comprise several juxtaposed contact means 130. So more precisely appended FIG. 7 illustrates two resilient mechanical contact elements, 133a and 133b, in parallel between the frame 106 and the mobile assembly 120.

According to another variant as per the present invention, the control means 160 cannot comprise levers and comprise a single manual adjusting screw 162 (or any equivalent means such as a motorised screw, a cam, or an electric actuator with ball screw, etc.) resting directly on the bearing 121 or the arm 124 of the lower cylinder 122, or even a sloped wedge supported on an area of the bearing mobile. FIG. 7 illustrates such an adjustment actuator under reference 162 directly stressing a stop 129 linked to the bearing 121 of the mobile assembly 120.

According to another variant according to the present invention, the link of the mobile cylinder 122 and of the frame 106 cannot be a pivot link by means of pivoting arm 124, but a rectilinear slide link 128 transversal to the rolling direction, as sown in FIG. 7.

According to another variant of the invention, the two control means 160 located on either side of the lower cylinder 122 can also be slaved in the same way and not be independent.

The device according to the present invention can also comprise decambering means which prevent the upper cylinders 112 from flexing slightly at their centre under the effect of the thrust due to crushing of the product.

When it is controlled automatically, the mobile device is optionally controlled during manufacture of the film as a function of data obtained from a measuring sensor, especially of thickness, placed at output of the rolling mill. Such a thickness sensor is shown under reference 195 in FIG. 7.

As indicated previously the mobile cylinder 122 is generally the lower cylinder of the device and the resilient contact means 130 are placed below the lower cylinder 122 and exert vertical force upwards. The mobile cylinder 122 can however be the upper cylinder. The cylinders can also be placed at the same horizontal level, the displacement direction of the film F being vertical in the rolling area such as shown in FIG. 7.

The fixed 110 and mobile 120 assemblies can comprise respectively a single cylinder (of rolling mill type called DUO) such as shown in FIGS. 2, 5 and 6, two cylinders each (of rolling mill type called QUARTO) such as shown in FIG. 7 on which the fixed assembly 110 comprises a working cylinder 112a in contact with the film and supported on a support cylinder 112b and the mobile assembly 120 also comprises a working cylinder 122a, facing the cylinder 112a and a support cylinder 122b, or even more than two cylinders (for example rolling mill known as "Sendzimir vault", etc.).

The cylinder with its trunnions is preferably monobloc to capitalise on good geometry and above all optimal dimensional stability irrespective of the operating conditions (temperature and rolling stresses especially).

It is evident that in its embodiments described the invention is highly advantageous since it creates precision almost equal to the micron over a width of film double the conventional width of two films intended to be placed in a battery (or around 31 cm in total)

For reasons of simplification the foregoing description mentions rolling "a film". But the invention must not be limited to a particular type of film, in particular a monolayer film. A multilayer film could be rolled in a single piece or additional operations could be performed at the same time as the rolling operation.

FIG. 2 for example shows the complexing and rolling also according to the invention of a composite structure comprising at input 3 separate films F0, F1 and F2, for example a film of central electrolyte F0 sandwiched in between two protective films respectively on each face F1 and F2 of the film F0 (for example polyethylene films), originating at input from 3 separate sources, but combined at rolling output into a single common film F. In this embodiment, it is evident that only the film F0 is crushed or rolled and that the protective films are assembled on the film F0 during rolling of the latter. The components of the film F0, F1 and F2 at input of rolling and the film F at output of rolling are guided and conveyed by two sets of rollers shown in the appended figures, known per se and likely to form the object of many embodiments such that their structures and positioning will not be described in the present patent application.

The invention claimed is:

1. A rolling device comprising a first fixed assembly connected to a frame of the device and comprising at least one first rolling cylinder rotatably mounted about its axis and a second assembly, mobile, comprising at least one second rolling cylinder rotatably mounted about its axis, the second assembly being mobile according to at least one degree of freedom relative to the first fixed assembly, such that the axis of the second cylinder is mobile relative to the axis of the first cylinder to control the distance between the cylinders, wherein the rolling device comprises:

resilient contact means which exert a first force on the mobile assembly in the direction of the first fixed assembly, these resilient contact means being configured to give way when a reaction force exerted by the mobile assembly on the resilient contact means is greater than a predetermined threshold force, and control means which exert on the mobile assembly a second force having a component essentially opposite the force exerted by the resilient contact means, and characterized in that the control means comprise at least one mechanical lever comprising a support point, forming an axis of rotation, on an element attached to the fixed assembly, the lever or at least one of the levers also being in contact with the mobile assembly and with a control adjusting element, the distance between a point of contact with the mobile assembly and the support point being less than the distance between a point of contact with the adjusting element and the support point, to produce fine adjustment and force multiplication.

2. The rolling device according to claim 1, wherein the control means comprise mechanical means which define an adjustable mechanical stop for the second mobile assembly.

3. The rolling device according to claim 1, wherein the first force exerted by the resilient contact means is between a force exerted by a film passing between the two cylinders in operating conditions and the reaction force attained in case of clogging.

4. The rolling device according to claim 1, wherein the mobile cylinder is rotatably mounted in two bearings located respectively on its ends and the resilient contact means are configured so that forces they apply to the mobile assembly are distributed equally on each bearing of the mobile cylinder.

5. The rolling device according to claim 1, wherein the resilient contact means comprise a deformable elastic envelope, filled with fluid, and comprising an output valve for fluid opening when pressure of fluid is greater than a predetermined pressure.

6. The rolling device according to claim 1, wherein the resilient contact means comprise a mechanical assembly ensuring resilient stressing of the mobile assembly towards a contact position but comprising an integrated mechanical fuse calculated to give way when the reaction force which is applied thereto reaches a threshold corresponding to the force resulting from clogging.

7. The rolling device according to claim 1, wherein the at least one mechanical lever includes several levers in series.

8. The rolling device according to claim 7, wherein the control means comprise return means ensuring maintaining of strain on said levers, these return means being adapted to keep a kinematic chain defined between an input control element to adjust control and an output stop, in contact with the input control element.

9. The rolling device according to claim 1, wherein the control element of the control means comprises a mobile device supported on a lever of the at least one mechanical lever and driven manually or automatically, the mobile device being chosen from the group consisting of a manual screw, a cam, or an electric actuator with ball screw.

10. The rolling device according to claim 1, wherein the control means comprise a kinematic chain formed by mechanical elements in mutual support, and wherein contacts between the mechanical elements in the kinematic chain are defined by protruding means.

11. The rolling device according to claim 1, further comprising a sensor attached to one of the mobile assembly and the fixed assembly and comprising a mobile portion intended to make contact with a stop of the other of the mobile assembly and the fixed assembly, to measure relative displacement of the mobile assembly of the rolling device.

12. The rolling device according to claim 1, wherein the mobile assembly comprises two pivoting support arms to be mobile to pivot relative to the fixed assembly, one arm being located at each end of the mobile cylinder, between one of each end of the mobile cylinder and the frame of the rolling device.

13. The device according to claim 12, wherein the two arms located at each end of the mobile cylinder are connected by at least one transversal bar attached to each of the two arms, forming an anti-roll device.

* * * * *